(12) United States Patent
Wehrle et al.

(10) Patent No.: US 10,571,010 B2
(45) Date of Patent: Feb. 25, 2020

(54) DRIVE WHEEL FOR A TRANSMISSION DRIVE DEVICE, AND TRANSMISSION DRIVE DEVICE

(71) Applicant: Robert Bosch GmbH, Stuttgart (DE)

(72) Inventors: Andreas Wehrle, Durbach (DE); Eugen Stoppel, Mühlingen (DE); Manuel Seidel, Dauchingen (DE); Stefan Hoch, Lenzkirch Saig (DE)

(73) Assignee: Robert Bosch GmbH, Stuttgart (DE)

( * ) Notice: Subject to any disclaimer, the term of this patent is extended or adjusted under 35 U.S.C. 154(b) by 119 days.

(21) Appl. No.: 15/854,024

(22) Filed: Dec. 26, 2017

(65) Prior Publication Data

US 2018/0180155 A1 Jun. 28, 2018

(30) Foreign Application Priority Data

Dec. 23, 2016 (DE) .................. 10 2016 226 131

(51) Int. Cl.
*F16H 55/17* (2006.01)
*F16H 55/06* (2006.01)
(Continued)

(52) U.S. Cl.
CPC ............. *F16H 55/06* (2013.01); *B29D 15/00* (2013.01); *F16H 55/17* (2013.01);
(Continued)

(58) Field of Classification Search
CPC .... F16H 2055/065; F16H 55/06; F16H 55/17; F16H 1/16; B29D 15/00; B29K 2059/00; B29L 2015/003; Y10T 29/4948
(Continued)

(56) References Cited

U.S. PATENT DOCUMENTS 3,200,665 A * 8/1965 Wells ...................... F16H 55/06
                                                        74/446
6,012,350 A * 1/2000 Mizuta ...................... B22F 5/08
                                                        74/434
(Continued)

FOREIGN PATENT DOCUMENTS

DE 112011100929 2/2013
DE 102014217012 A1 3/2015
(Continued)

*Primary Examiner* — Jake Cook
*Assistant Examiner* — Randell J Krug
(74) *Attorney, Agent, or Firm* — Michael Best & Friedrich LLP

(57) ABSTRACT

A drive wheel (10; 100) wherein the drive wheel (10; 100) is formed by an injection-molding process, and has a longitudinal axis (11; 108), having a hub region (12; 102) with a hub opening (13; 102), having an annular toothed-rim region (17; 106) with a radially outwardly projecting toothing (18; 105), having a substantially disk-like intermediate region (15; 112) which is arranged radially between the hub region (12; 102) and the toothed-rim region (17; 106), wherein the drive wheel (10; 100) has two bearing points (31, 32), arranged concentrically with the longitudinal axis (11; 108), for radial mounting and two bearing points (33, 34; 121, 122), for axial mounting, and wherein the hub region (12; 102) has an extension (14; 103) that protrudes from the plane of the intermediate region (15; 112) in the direction of the longitudinal axis (11; 108).

12 Claims, 7 Drawing Sheets

(51) Int. Cl.
  *B29D 15/00*    (2006.01)
  *B29K 59/00*    (2006.01)
  *B29L 15/00*    (2006.01)

(52) U.S. Cl.
  CPC ..... *B29K 2059/00* (2013.01); *B29L 2015/003* (2013.01); *F16H 2055/065* (2013.01)

(58) Field of Classification Search
  USPC .................................. 74/425, 458, DIG. 10
  See application file for complete search history.

(56) References Cited

U.S. PATENT DOCUMENTS

| 8,267,234 B2 * | 9/2012 | Koop ..................... F16D 7/044 |
| | | 192/55.2 |
| 2008/0276741 A1 | 11/2008 | Miura |
| 2013/0000435 A1 | 1/2013 | Uenishi et al. |

FOREIGN PATENT DOCUMENTS

| DE | 102016222115 A1 * | 5/2018 | ......... B29C 45/4478 |
| JP | 2003139219 | 5/2003 | |
| JP | 2003191288 | 7/2003 | |
| JP | 2009127677 | 6/2009 | |
| JP | 2009127677 A * | 6/2009 | |
| WO | 2016066745 | 5/2016 | |

* cited by examiner

DRIVE WHEEL FOR A TRANSMISSION DRIVE DEVICE, AND TRANSMISSION DRIVE DEVICE

BACKGROUND OF THE INVENTION

The invention relates to a drive wheel for a transmission drive device. Furthermore, the invention relates to a transmission drive device having a housing which is configured to receive a drive wheel.

FIG. 1 shows a perspective longitudinal section through a drive wheel 100 according to the prior art. The drive wheel 100 has a hub region 101 with a hub opening 102 via which the drive wheel 100 can be mounted on an axle (not shown) in a housing of a transmission drive device. Also apparent is an extension 103, formed in the hub region 101, with an external toothing 104, wherein the external toothing 104 on the extension 103 serves to connect the drive wheel 100 for conjoint rotation to an element to be driven, for example a cable drum of a window winder drive in a motor vehicle. The drive wheel 100 is driven by an electric motor at least indirectly via a toothing 105 on a toothed-rim region 106. The toothed-rim region 106 is connected to a disk-like intermediate region 112 via a reinforcing ring 110 that is arranged between the hub region 101 and the toothed-rim region 106 and extends radially about a longitudinal axis 108. The two opposite end sides 113, 114 of the intermediate region 112 are formed in a substantially planar manner. Furthermore, the wall thickness s of the intermediate region 112 between the hub region 101 and the reinforcing ring 110 is substantially constant. Optionally, thickened portions 115 are formed in the region of the two end sides 113, 114, the wall thickness s of the intermediate region 112 being increased in the region of said thickened portions 115, wherein the thickened portions 115 are formed for example in a circular manner.

The drive wheel 100 has two bearing points 121, 122, spaced apart from one another with respect to the longitudinal axis 108, for axially mounting the drive wheel 100. One bearing point 121 is formed by an end face 123, radially encircling the longitudinal axis 108 in an annular manner, on an intermediate ring 125 protruding from the plane of the intermediate region 112. Furthermore, the drive wheel 100 has two bearing points 126, 127 that serve for radial mounting. What is essential here is that the bearing point 121 extends radially, with respect to the longitudinal axis 108, outside the two bearing points 126, 127 that serve for radial mounting, and is arranged on the intermediate ring 125.

A drive wheel 100 according to the prior art, as described, meets the requirements placed on the drive wheel 100 with regard to required strength, wear etc. in a satisfactory manner, but has a relatively high material requirement and thus a relatively high weight.

SUMMARY OF THE INVENTION

The drive wheel according to the invention has the advantage that, while retaining the required functional properties, in particular with regard to sufficiently high strength, it has a particularly low weight.

To this end, the invention provides that, by way of a modified arrangement, compared with the prior art, of a bearing point for axially mounting the drive wheel, it is possible to dispense with the intermediate ring 125 which is provided in the prior art according to FIG. 1 and the configuration of which is associated with an additional material volume and thus with an additional weight. This is achieved according to the invention in that the addressed bearing point for axial mounting is relocated radially toward the inside into the immediate region of a hub bore in the hub region.

Alternatively or additionally, the second independent claim provides that the reinforcing ring which is present in the prior art and extends radially between the toothed-rim region and the intermediate region is dispensed with. Direct coupling of the toothed-rim region to the intermediate region thus takes place.

In a particularly preferred configuration of the arrangement of the two bearing points for axial mounting, provision is made for the arrangement thereof to be such that they cooperate with an axle in a housing (transmission housing). The background for this is that such an axle consists in particular of metal, or steel, and is used as an insert part in the housing that consists, as an injection-molding, of plastics material, such that it is regionally overmolded with plastics material of the housing. By contrast, the prior art provides that the two bearing points for axial mounting are arranged on a wall (housing bottom) of the housing and on the axle. Since both (axial) bearing points are now located in the region of the axle, improved properties also arise in that optimal friction or wear properties are achievable for example by way of corresponding material pairings in the case of the plastics material for the drive wheel and for the axle, without a particular plastics material for example having to be used for the housing as a result. Furthermore, since one bearing point for axially mounting the drive wheel has been moved radially inward with respect to the longitudinal axis, this also results in fundamentally improved friction properties. The improved friction properties result from a smaller friction radius and a shorter friction circumferential length in the region of the bearing point.

In a further, particularly preferred configuration of the invention, which allows a further saving in weight, provision is made for the intermediate region between the hub region and the toothed-rim region to be formed in a conical manner in cross section, such that it has a greater wall thickness on the side facing the hub region than on the side facing the toothed-rim region.

In order, in spite of the wall thickness, the creasing in the direction of the toothed-rim region, of the intermediate region, to allow sufficiently great rigidity of the drive wheel, provision can furthermore be made for the intermediate region to have, on at least one end side arranged perpendicularly to the longitudinal axis of the drive wheel, a plurality of first reinforcing ribs that are arranged at equal angular distances about the longitudinal axis and extend radially between the hub region and the toothed-rim region. The first reinforcing ribs bring about greater (flexural) rigidity of the intermediate region in a direction extending parallel to the longitudinal axis.

In order to achieve optimal strength properties with a minimum weight in the installed state of the drive wheel in the transmission housing in conjunction with the addressed first reinforcing ribs, provision is preferably also made for the height of the first reinforcing ribs on the end side, facing the transmission housing, of the drive wheel to increase in the direction of the toothed-rim region.

In particular when a relatively large angular distance is formed between the first reinforcing ribs, because for example a relatively small number of first reinforcing ribs are intended to be used for weight reasons, it is advantageous when, to improve the flow behavior of the plastics material during the injection-molding process and to achieve a uniform shrinkage behavior, in each case at least one, preferably a plurality of second reinforcing ribs are arranged between the first reinforcing ribs, said second reinforcing ribs being connected to the toothed-rim region, wherein the distances between the first and second reinforcing ribs in the circumferential direction are preferably the same size, and wherein the second reinforcing ribs do not extend radially into the hub region.

Furthermore, in order to optimize the force introduction into the first reinforcing ribs, or to save more weight, it is proposed that the toothed-rim region have, on the side facing away from the toothing, between two first reinforcing ribs, a wall portion with a radius such that the wall thickness of the toothed-rim region has a minimum in the circumferential direction between two first reinforcing ribs.

The invention also comprises a transmission drive device, in particular for a comfort drive in a motor vehicle, such as a window winder drive, a sunroof drive or the like, having a housing for receiving a drive wheel according to the invention as described thus far. Such a transmission drive device has the advantage of a particularly low weight as a result of a weight-optimized drive wheel.

BRIEF DESCRIPTION OF THE DRAWINGS

Further advantages, features and details of the invention can be gathered from the description of preferred exemplary embodiments and from the drawing, in which.

Identical elements or elements with an identical function are provided with the same reference signs in the figures.

DETAILED DESCRIPTION

Figure 1:
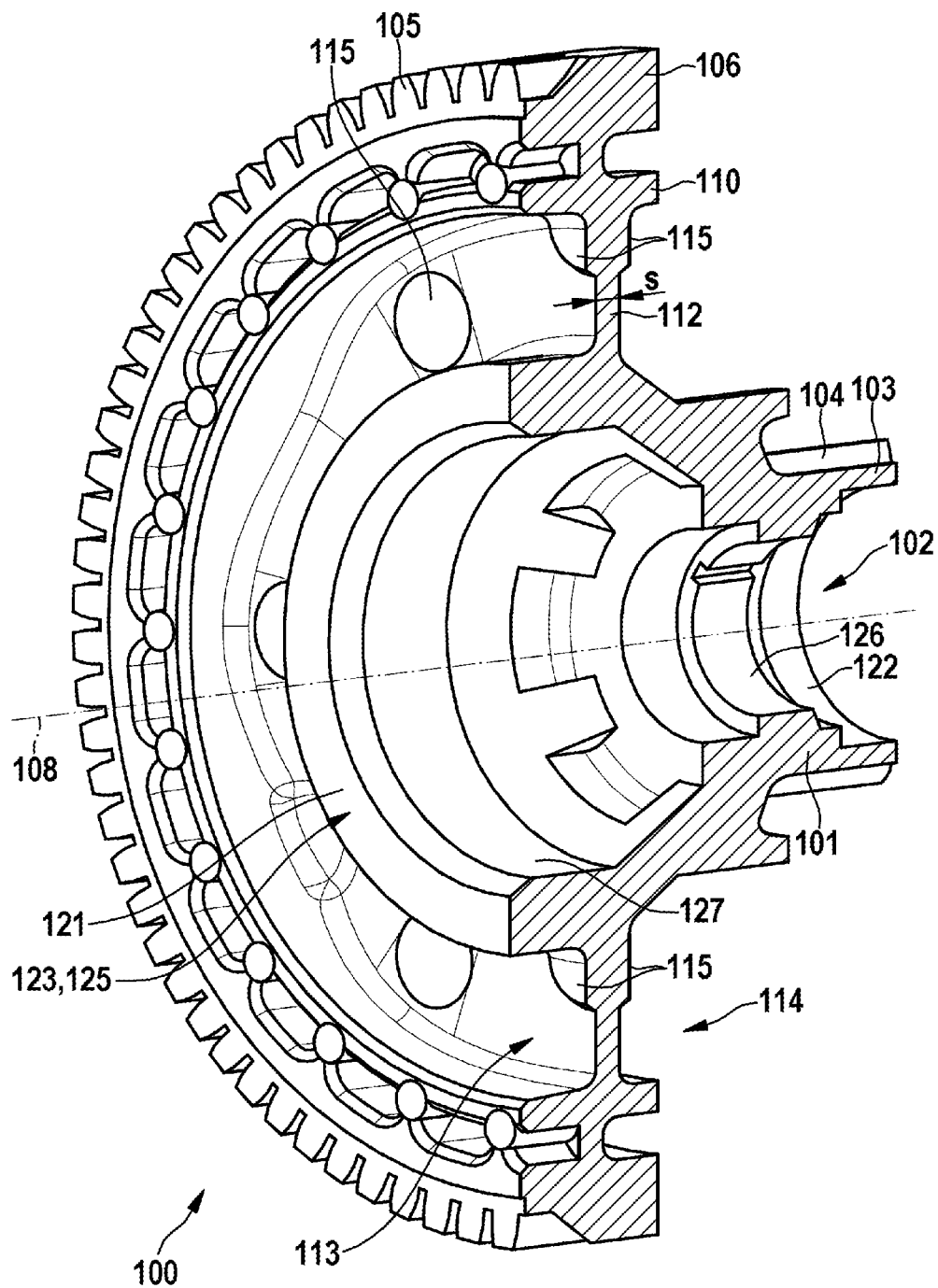
FIG. 1 shows a longitudinal section, in a perspective illustration, through a drive wheel for a transmission drive device according to the prior art.
Figure 2:
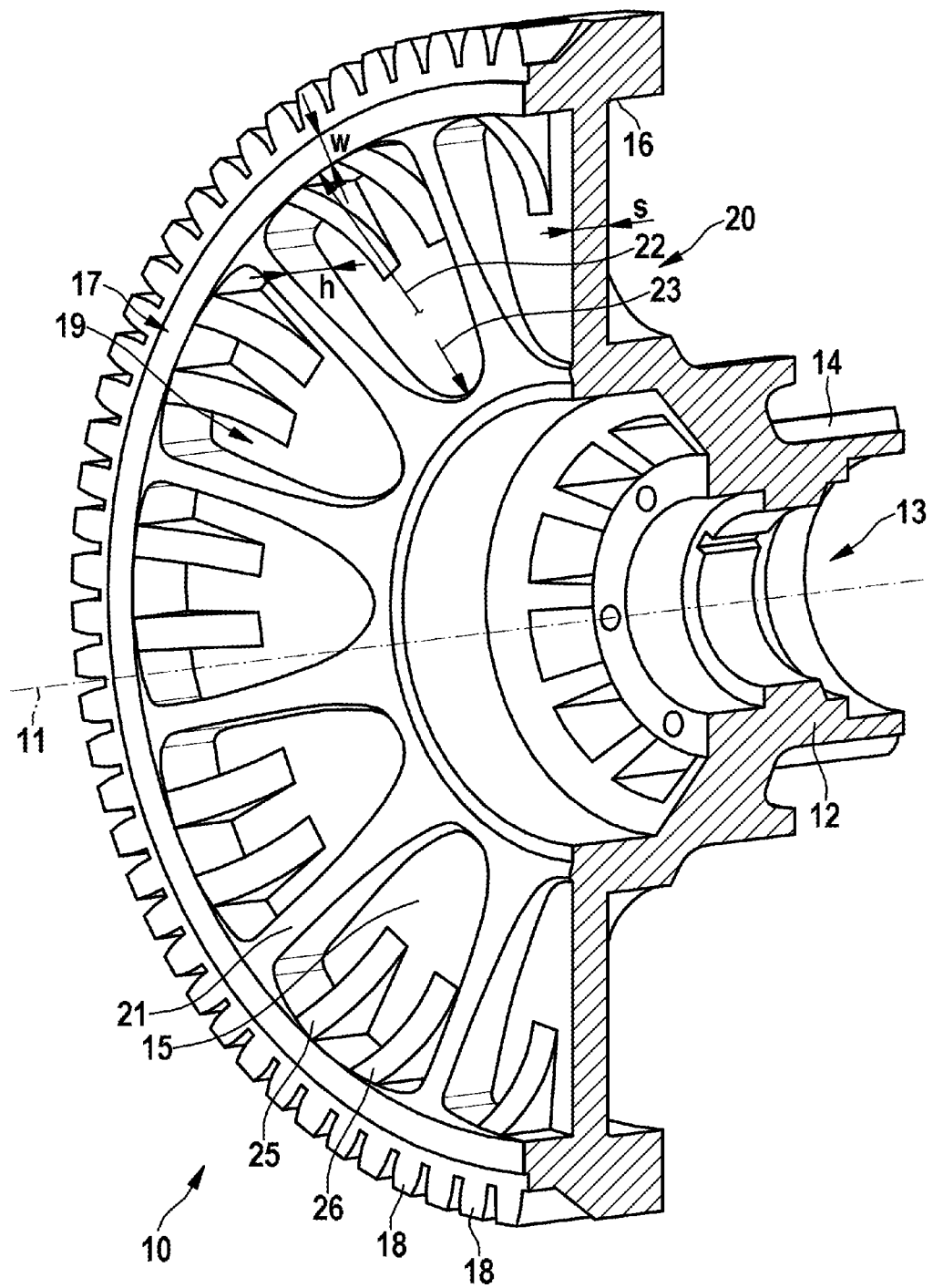
FIG. 2 shows a longitudinal section, in a perspective illustration, through a drive wheel according to the invention from a first direction.
Figure 3:
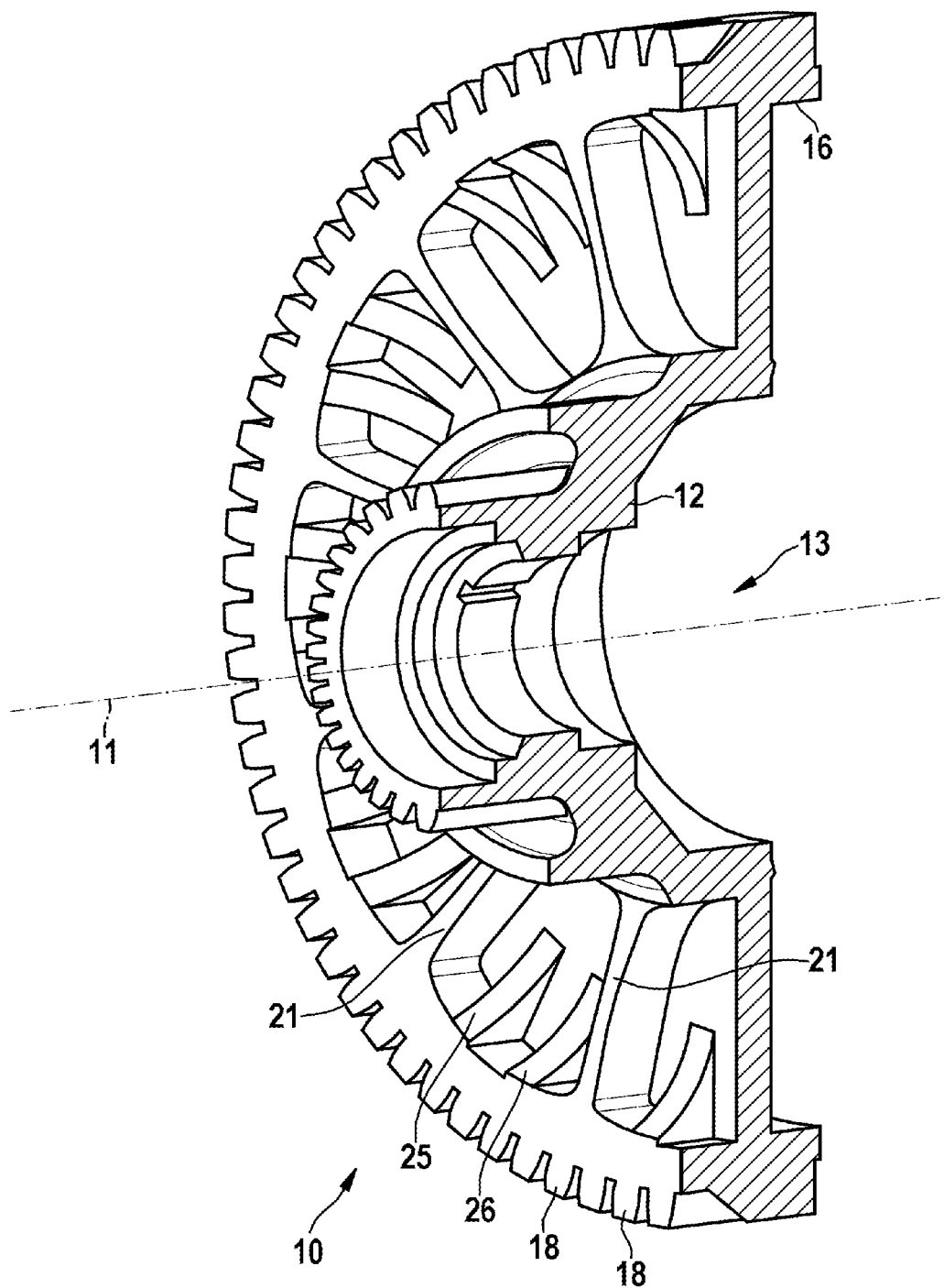
FIG. 3 shows the drive wheel according to FIG. 2 in a perspective longitudinal section from another direction.

The drive wheel 10 shown in FIGS. 2 to 6 consists of plastics material and is produced by an injection-molding process. The plastics material is for example POM (polyoxymethylene), without being limited thereto. The drive wheel 10 is used in particular as a component of a transmission drive device (not shown), wherein the drive wheel 10 is insertable into a housing 1, illustrated partially in FIG. 7, which is configured in particular as a plastics injection-molding and has an axle 2 that consists of metal.

In addition, it is mentioned that the axle 2 can also consist of plastics material, however. If the plastics material for the axle 2 is the same plastics material as for the housing 1, the axle can be formed at the same time as the housing 1. If different plastics materials are used for the axle 2 and the housing 1, the axle 2 can be designed for example as an insert part for the housing 1.

The drive wheel 10 has a longitudinal axis 11 about which a hub region 12 is arranged in a concentric manner. The hub region 12 has a through-opening in the form of a hub opening 13 in order for it to be possible to mount, or rotatably mount, the drive wheel 10 on the axle 2 in the housing 1. The hub region 12 is connected integrally (monolithically) to a toothed-rim region 17 via an approximately disk-like intermediate region 15 that is arranged radially about the longitudinal axis 11, wherein the hub region 12 has a sleeve-like extension 14 that projects away from the plane of the intermediate region 15. The toothed-rim region 17 has, on the side facing away from the hub region 12, a radially outwardly projecting toothing 18, via which the drive wheel 10 is able to be driven at least indirectly by an electric motor (likewise not illustrated) of the transmission drive device. The cross section of the toothed-rim region 17 is at least substantially rectangular, wherein the wall 16, on the opposite side from the toothing 18, of the toothed-rim region 17 is directly connected to the intermediate region 15.

The intermediate region 15 has a wall thickness s which decreases in the radial direction from the hub region 12 in the direction of the toothed-rim region 17, i.e. the intermediate region 15 has its greatest wall thickness s at the attachment point to the hub region 12, and has its smallest wall thickness s in the region of the connection to the toothed-rim region 17. The attachment of the intermediate region 15 to the toothed-rim region 17 takes place, with regard to the toothed-rim height, in a central region of the toothed-rim region 17. Furthermore, the intermediate region 15 has, on at least its one end side 19, preferably also on the other end side 20, in each case a plurality of first reinforcing ribs 21 that are arranged at equal angular distances about the longitudinal axis 11 and extend radially between the hub region 12 and the toothed-rim region 17. The height h of the first reinforcing ribs 21 (FIG. 2) increases in the radial direction from the hub region 12 in the direction of the toothed-rim region 17, such that the first reinforcing ribs 21 end flush with the surface of the corresponding end side of the toothed-rim region 17.

A rounding 23 is formed in each case between the first reinforcing ribs 21 in the hub region 12, such that two first reinforcing ribs 21 that follow one another in the circumferential direction transition directly into one another in the hub region 12 and the hub region 12 has increased rigidity there in the direction of the hub region 12. Furthermore, a radius 22 is formed on the side facing the toothed-rim region 17, between the two first reinforcing ribs 21, such that the wall thickness w of the toothed-rim region 17 has a minimum in the middle between two first reinforcing ribs 21, as seen in the circumferential direction.

Furthermore, two second reinforcing ribs 25, 26 are formed on at least one, preferably likewise on both end sides 19, 20 of the intermediate region 15 between two first reinforcing ribs 21. The second reinforcing ribs 25, 26, the height of which likewise increases in the radial direction toward the toothed-rim region 17, are arranged at equal distances from the first reinforcing ribs 21, such that equal distances are formed in each case between the first reinforcing ribs 21 and the second reinforcing ribs 25, 26, as seen in the circumferential direction. Furthermore, the second reinforcing ribs 25, 26 do not extend into the hub region 12, as seen in the radial direction, but extend approximately from the outer third of the intermediate region 15 as far as the toothed-rim region 17, as seen in the radial direction of the intermediate region 15.

Figure 4:
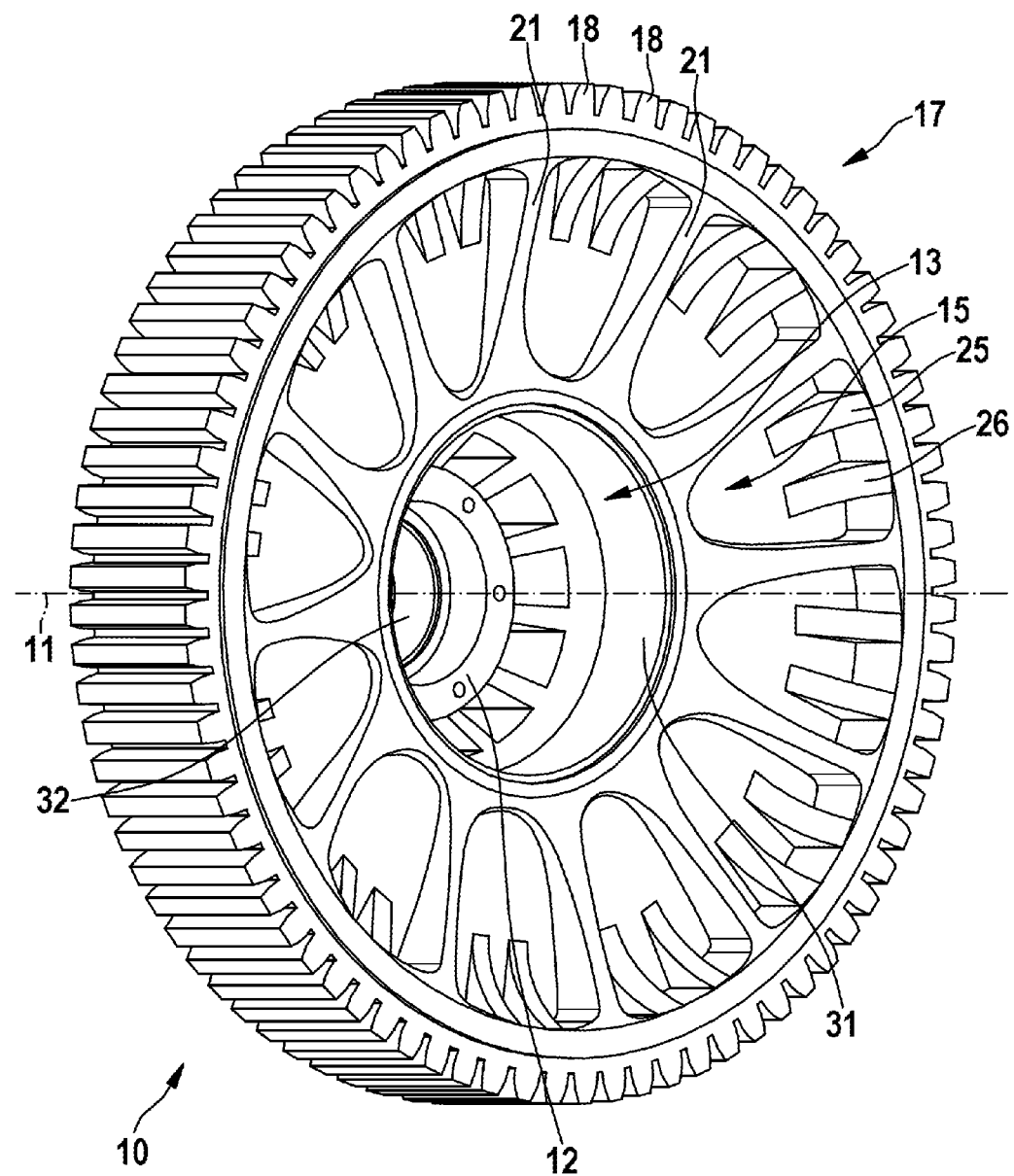
FIG. 4 shows a perspective illustration of the drive wheel similar to FIG. 2, FIGS. 5 and 6 show the drive wheel according to FIG. 4 from different directions, likewise in a perspective illustration.

In order to radially mount the drive wheel 10 on the axle 2 in the housing 1, the drive wheel 10 has two bearing points 31, 32 arranged concentrically with the longitudinal axis 11 (FIG. 4). The two bearing points 31, 32 are arranged on the inner wall of the hub opening 13 and are spaced apart axially from one another with regard to the longitudinal axis 11. Furthermore, the drive wheel 10 has two bearing points 33, 34 that serve for axial mounting (FIGS. 5 and 6) and are likewise formed in the region of the hub opening 13 of the hub region 12. The two bearing points 33, 34 extend radially within the radially outer (radial) bearing point 31, as seen with regard to the longitudinal axis 11.

Figure 5:
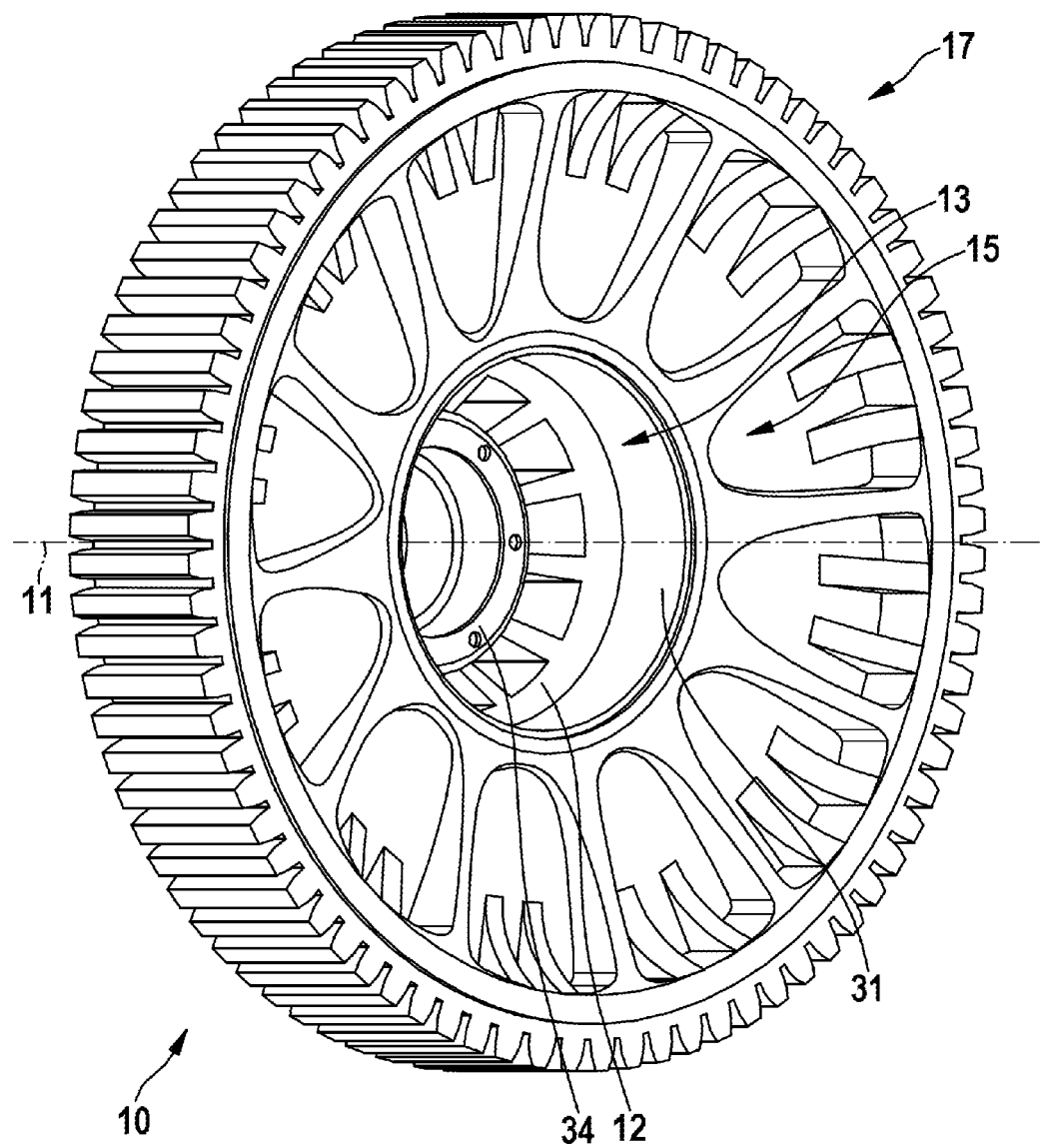
Figure 6:
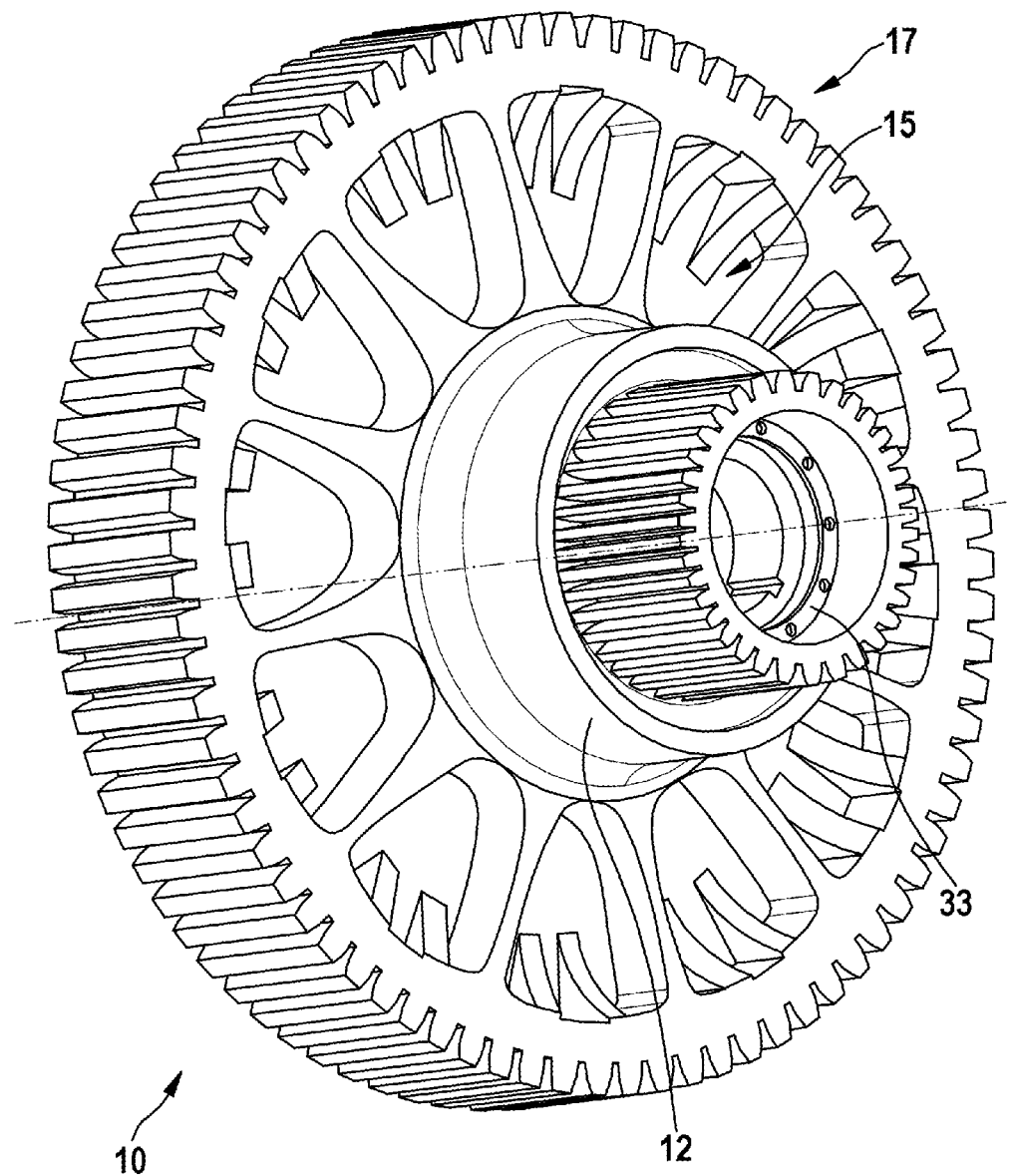
Figure 7:
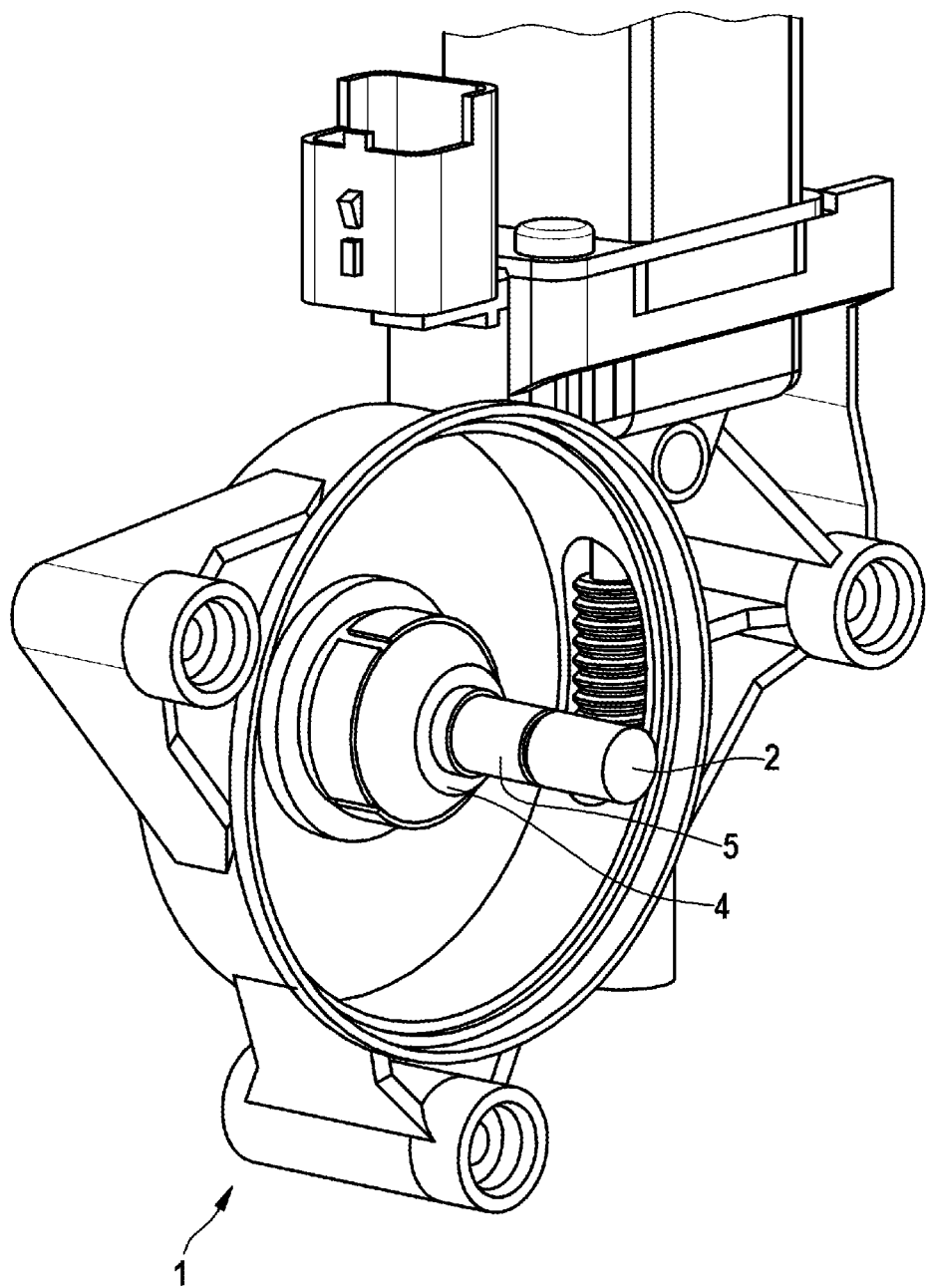
FIG. 7 shows a housing part of a transmission drive device for receiving a drive wheel in a perspective illustration.

Furthermore, it is apparent from FIGS. 5 and 6 that the two bearing points 33, 34 are configured as (planar) faces that extend annularly about the longitudinal axis 11. The two bearing points 33, 34 cooperate, in accordance with FIG. 7, with two bearing points 4, 5 that are formed in the region of the axle 2.

The drive wheel 10 as described can be modified in many ways without deviating from the concept of the invention. In particular, the reinforcing ribs can also be formed in a drive wheel 10 in which the two radial bearing points of the drive wheel 10 can also have the same radius, and transition integrally into one another.

What is claimed is:

1. A drive wheel for a transmission drive device, wherein the drive wheel is made of plastics material, is formed by an injection-molding process, and has a longitudinal axis, having a hub region with a hub opening which is configured for mounting the drive wheel on an axle in a housing, having an annular toothed-rim region with a radially outwardly projecting toothing, having an intermediate region which is arranged radially between the hub region and the toothed-rim region, wherein the drive wheel has two bearing points, arranged concentrically with the longitudinal axis, for radial mounting and two bearing points, spaced apart axially from one another in the direction of the longitudinal axis, for axial mounting, and wherein the hub region has an extension that protrudes from the plane of the intermediate region in the direction of the longitudinal axis, characterized in that the two bearing points for axial mounting are arranged radially on the inside of the bearing point, at a greater distance from the longitudinal axis, for radial mounting, wherein the toothed-rim region has a rectangular cross section and, on a side of the cross section that is radially opposite the toothing, is connected directly to the intermediate region by a wall, and wherein the intermediate region has, on at least one end side arranged perpendicularly to the longitudinal axis, a plurality of first reinforcing ribs that are arranged at equal angular distances about the longitudinal axis and extend radially between the hub region and the toothed-rim region, and further wherein two first reinforcing ribs that are arranged next to one another are connected together in a tangential direction in the hub region by an arcuate connecting portion, and enclose in an arch-shaped manner second reinforcing ribs that are arranged between the first reinforcing ribs in the tangential direction and do not extend radially into the hub region.

2. The drive wheel according to claim 1, characterized in that the two bearing points for axial mounting are arranged in a region of the hub opening of the extension and are formed by annular surfaces that extend radially about the longitudinal axis.

3. The drive wheel according to claim 1, characterized in that the intermediate region is formed in a conical manner in cross section, such that the intermediate region has a greater wall thickness on a side facing the hub region than on a side facing the toothed-rim region.

4. The drive wheel according to claim 1, characterized in that a height of the first reinforcing ribs increases in a direction of the toothed-rim region on the end side, facing a housing, of the drive wheel.

5. The drive wheel according to claim 1, characterized in that the second reinforcing ribs are connected to the toothed-rim region, wherein distances between the first and second reinforcing ribs in a circumferential direction are the same.

6. The drive wheel according to claim 1, characterized in that the toothed-rim region has, on a side facing away from the toothing, between two first reinforcing ribs, a wall with a radius such that a wall thickness of the toothed-rim region is at a minimum in the radial direction between the two first reinforcing ribs.

7. A drive wheel for a transmission drive device, wherein the drive wheel is made of plastics material, is formed by an injection-molding process, and has a longitudinal axis, having a hub region with a hub opening which is configured for mounting the drive wheel on an axle in a housing, having an annular toothed-rim region with a radially outwardly projecting toothing, having an intermediate region which is arranged radially between the hub region and the toothed-rim region, wherein the drive wheel has two bearing points, arranged concentrically with the longitudinal axis, for radial mounting and two bearing points, spaced apart axially from one another in the direction of the longitudinal axis, for axial mounting, and wherein the hub region has an extension that protrudes from the plane of the intermediate region in the direction of the longitudinal axis, characterized in that the toothed-rim region has a rectangular cross section and, on a side of the cross section that is radially opposite the toothing, is connected directly to the intermediate region by a wall, wherein the intermediate region has, on at least one end side arranged perpendicularly to the longitudinal axis, a plurality of first reinforcing ribs that are arranged at equal angular distances about the longitudinal axis and extend radially between the hub region and the toothed-rim region, and wherein two first reinforcing ribs that are arranged next to one another are connected together in a tangential direction in the hub region by an arcuate connecting portion, and enclose in an arch-shaped manner second reinforcing ribs that are arranged between the first reinforcing ribs in the tangential direction and do not extend radially into the hub region.

8. The drive wheel according to claim 7, characterized in that the intermediate region is formed in a conical manner in cross section, such that the intermediate region has a greater wall thickness on a side facing the hub region than on a side facing the toothed-rim region.

9. The drive wheel according to claim 7, characterized in that a height of the first reinforcing ribs increases in a direction of the toothed-rim region on the end side, facing a housing, of the drive wheel.

10. The drive wheel according to claim 7, characterized in that the second reinforcing ribs are connected to the toothed-rim region, wherein distances between the first and second reinforcing ribs in a circumferential direction are the same.

11. The drive wheel according to claim 7, characterized in that the toothed-rim region has, on a side facing away from the toothing, between two first reinforcing ribs, a wall with a radius such that a wall thickness of the toothed-rim region is at a minimum in the radial direction between the two first reinforcing ribs.

12. A transmission drive device having a housing for receiving a drive wheel which is configured according to the drive wheel of claim 1.

* * * * *